(12) United States Patent
    Cole

(10) Patent No.: US 12,634,223 B1
(45) Date of Patent: May 19, 2026

(54) GEO-POSITION BASED NETWORK ROUTING PROTOCOL

(71) Applicant: OnOffBlock, Inc., Lisle, IL (US)

(72) Inventor: Jeffrey Palmer Cole, Shoreview, MN (US)

(73) Assignee: Xenesis Global Inc., Lisle, IL (US)

( * ) Notice: Subject to any disclaimer, the term of this patent is extended or adjusted under 35 U.S.C. 154(b) by 300 days.

(21) Appl. No.: 18/376,623

(22) Filed: Oct. 4, 2023

(51) Int. Cl.
    *H04L 45/12* (2022.01)
    *H04L 45/74* (2022.01)

(52) U.S. Cl.
    CPC ............ *H04L 45/126* (2013.01); *H04L 45/74* (2013.01); *H04L 2212/00* (2013.01)

(58) Field of Classification Search
    None
    See application file for complete search history.

(56) References Cited

U.S. PATENT DOCUMENTS

| | | | |
|---|---|---|---|
| 9,473,578 | B2 | 10/2016 | Gopal et al. |
| 9,594,538 | B2 | 3/2017 | Jouin |
| 9,763,167 | B2 | 9/2017 | Gopal et al. |
| 9,877,195 | B2 | 1/2018 | Huber et al. |
| 10,117,249 | B2 | 10/2018 | Ravishankar et al. |
| 10,785,754 | B2 | 9/2020 | Negus et al. |
| 10,859,712 | B2 | 12/2020 | Soualle et al. |
| 11,073,622 | B2 | 7/2021 | Cohen |
| 11,424,821 | B2 | 8/2022 | Foxworthy et al. |
| 11,581,655 | B2 | 2/2023 | Jensen et al. |
| 2024/0195496 | A1* | 6/2024 | Rezaee ............. H04B 7/18521 |

FOREIGN PATENT DOCUMENTS

| | | | | |
|---|---|---|---|---|
| CN | 104821844 | B | 11/2017 | |
| EP | 3334214 | B1 * | 8/2024 | ........... H04L 45/124 |

* cited by examiner

*Primary Examiner* — Christine T Duong
(74) *Attorney, Agent, or Firm* — POLSINELLI PC

(57) ABSTRACT

Aspects of the disclosure are directed to a geo-positional, dynamic label switch routing protocol for routing data packets in a network. The protocol incorporates real-time geo-positional data with multi-protocol label switching (MPLS) to enable devices in the network to be responsive to location and timing of other devices in the network when routing data packets. As a data packet traverses from origin to destination, the network devices can encapsulate the data packet with a shim header that carries label information associated with which network device can relay the next data flow based on continually or periodically received geo-position and time feeds.

20 Claims, 4 Drawing Sheets

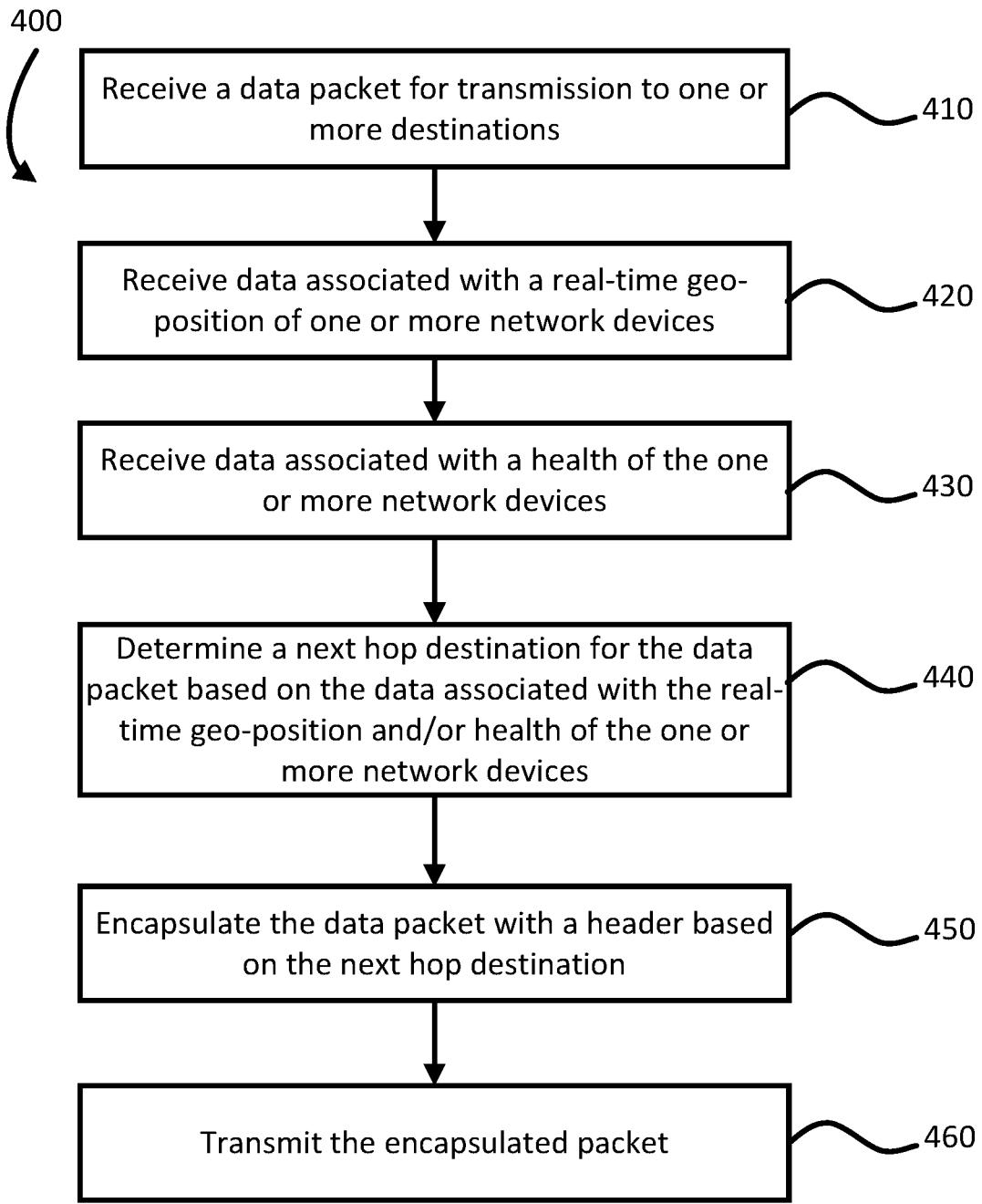

400

Receive a data packet for transmission to one or more destinations — 410

Receive data associated with a real-time geo-position of one or more network devices — 420

Receive data associated with a health of the one or more network devices — 430

Determine a next hop destination for the data packet based on the data associated with the real-time geo-position and/or health of the one or more network devices — 440

Encapsulate the data packet with a header based on the next hop destination — 450

Transmit the encapsulated packet — 460

FIG. 4

GEO-POSITION BASED NETWORK ROUTING PROTOCOL

BACKGROUND

For transmitting data packets in a network, Internet Protocol (IP) routing may be used to determine a suitable path for a data packet to travel from a source to a destination. With IP routing, each router in the network independently determines the next hop of a data packet by inspecting the destination IP address of the data packet. To do so, a router, after receiving a data packet, may consult a routing table to determine where the data packet should be sent next, i.e., the next hop, based on the determined destination IP address. As each router is required to consult a routing table to determine the next hop for the data packet, IP routing can be slow and inefficient.

Multi-protocol label switching (MPLS) is an alternative to IP routing. MPLS allows routers to forward the data packets at a switching level, commonly referred to as "Layer 2", rather than a routing level, commonly referred to as "Layer 3". MPLS can direct data packets to travel from a source to a destination based on labels rather than IP addresses, which can improve the speed at which the data packets reach their destination. The labels provide information to the routers to transmit the data packets along a particular path. However, MPLS-based routers or switches do not account for location at a time when determining how to forward data packets, which can still result in latencies and/or inefficient use of hardware resources as the data packet may not traverse an optimal path to its destination. This can lead to degraded performance for real-time applications, such as audio or video communication.

BRIEF SUMMARY

Aspects of the disclosure are directed to a geo-positional, dynamic label switch routing protocol for routing data packets in a network. The protocol incorporates real-time geo-positional data with multi-protocol label switching (MPLS) to enable devices in the network to be responsive to the location of other devices in the network at the time of routing data packets. As a data packet traverses from origin to destination, the network devices can encapsulate the data packet with a shim header that carries label information associated with which network device can relay the next data flow based on continually or periodically received geo-position and time feeds.

An aspect of the disclosure provides for a method of routing data packets in a network including: receiving, by one or more processors of a network device, a data packet for transmission to one or more destinations; receiving, by the one or more processors, data associated with a real-time geo-position of one or more other network devices; determining, by the one or more processors, a next hop destination for the data packet based on the data associated with the real-time geo-position of the one or more other network devices; encapsulating, by the one or more processors, the data packet with a header comprising an address for the next hop destination; and transmitting, by the one or more processors, the encapsulated packet.

Another aspect of the disclosure provides for a system including: one or more processors; and one or more storage devices coupled to the one or more processors and storing instructions that, when executed by the one or more processors, cause the one or more processors to perform a method for routing data packets in a network, the method including:

receiving a data packet for transmission to one or more destinations; receiving data associated with a real-time geo-position of one or more other network devices; determining a next hop destination for the data packet based on the data associated with the real-time geo-position of the one or more other network devices; encapsulating the data packet with a header comprising an address for the next hop destination; and transmitting the encapsulated packet.

Yet another aspect of the disclosure provides for a non-transitory computer readable medium for storing instructions that, when executed by one or more processors, cause the one or more processors to perform a method for routing data packets in a network, the method including: receiving a data packet for transmission to one or more destinations; receiving data associated with a real-time geo-position of one or more other network devices; determining a next hop destination for the data packet based on the data associated with the real-time geo-position of the one or more other network devices; encapsulating the data packet with a header comprising an address for the next hop destination; and transmitting the encapsulated packet.

In an example, the method further includes receiving, by the one or more processors, data associated with a health of the one or more other network devices. In another example, determining the next hop destination is further based on the data associated with the health of the one or more other network devices. In yet another example, the one or more destinations further comprise one or more virtual machines. In yet another example, the data associated with the real-time geo-position of the one or more other network devices further includes a location and time of each of the one or more other network devices. In yet another example, the header includes a shim header and the address includes at least one of an Internet protocol (IP) address or a media access control (MAC) address. In yet another example, the network is employed in low earth orbit (LEO). In yet another example, the network includes a software defined wide area network (SD-WAN).

BRIEF DESCRIPTION OF THE DRAWINGS

FIG. 4 depicts a flow diagram of an example process for routing data packets in a network based on a geo-positional, dynamic label switch routing protocol according to aspects of the disclosure.

DETAILED DESCRIPTION

The technology relates generally to a geo-positional, dynamic label switch routing protocol for routing data packets in a network. For example, the protocol can be utilized in a software defined wide area network (SD-WAN) employed in low earth orbit (LEO) satellite optical links for data communications. The protocol incorporates real-time geo-positional data with multi-protocol label switching (MPLS) to enable devices in the network to be responsive to the location and timing of other devices in the network when routing data packets. Timing may refer to a capability of a network device to execute commands across various combinations of network devices to preclude disruption and ensure delivery of data packets to their destinations as defined by customer requirements and expectation. The protocol can further account for the health of the devices in the network when routing data packets to optimize delivery paths and reduce latency. For example, the protocol can develop paths for routing the data packets based on geo-position, time, network traffic, packet volume, network device health, packet priority, and/or total distance for delivery. As a data packet traverses from origin to destination, the network devices can encapsulate the data packet with a shim header that carries label information about dynamic route network flows across the network. The label information can include information associated with which network device can relay the next data flow based continually or periodically received geo-position and time feeds.

Figure 1:
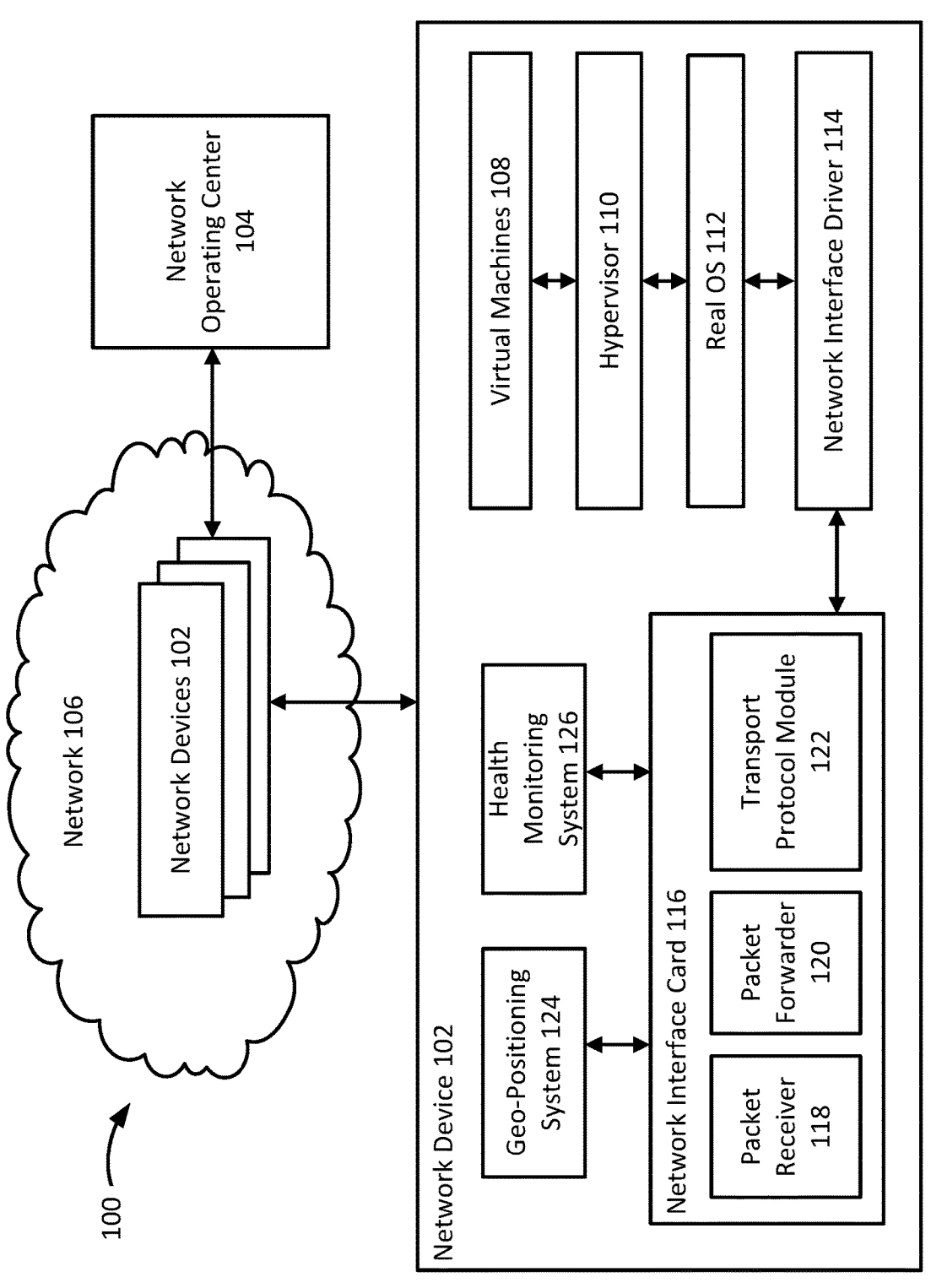
FIG. 1 depicts a block diagram of an example network with a plurality of network devices configured to route data packets according to aspects of the disclosure.

FIG. 1 depicts a block diagram of an example network 100 with a plurality of network devices 102 configured to route data packets according to protocols received from a network operating center 104. The network devices 102 can be linked as part of a network 106 of interconnected network nodes participating in the network 106 as data sources, data destinations, and/or intermediary nodes propagating data from the sources to the destinations through the network 106. Example network devices 102 can include switches, routers, and/or gateways. The network operating center 104 can manage the network devices 102 by continually or periodically collecting a real-time position and/or health of each network device 102 for determining how to route data packets in the network 106.

The network 106 can allow for interactions between the plurality of network devices 102, such as conveying information between computing devices. The network can be public, private, or a combination of public and private and/or be composed of one or more sub-networks or autonomous networks. The network 106 can be any type and/or form of data network and/or communication network involving the deployment of network devices in orbit, such as a wide area network (WAN).

For example, the network 106 can be a SD-WAN and the network devices 102 can be LEO satellite optical links for data, such as audio or video communications. Optical links may refer to devices for communicating data packets over a network, including switches, routers, and/or gateways. For example, a satellite-2-satellite optical link may refer to an optical link that communicates between satellites in orbit. LEO may refer to a circular or elliptical orbit relatively close to Earth's surface, particularly compared to geostationary orbit (GEO). LEO orbits may range from about 2000 km to 250 km above Earth. LEO satellites typically do not follow a particular path around Earth, whereas GEO satellites generally orbit along Earth's equator. Given that LEO satellites do not follow a strict path, monitoring the positions of the LEO satellites provides the opportunity to improve pathway selection for data packet routing, as described further herein. Further, communications from LEO satellites generally experience only about 20-55 ms of latency given their high orbital speeds, providing the opportunity for real time or near real time communications, such as for time sensitive data packets.

The network devices 102 can be host devices or server devices on satellites or on the ground. The host devices or server devices can execute one or more virtual machines on one or more processors of a network device. Each network device 102 can include one or more virtual machines 108, a hypervisor 110, a real operating system (OS) 112, a network interface driver 114, a network interface card 116, a geo-positioning system 124, and a health monitoring system 126. The network devices 102 can generate or participate in one or more virtual networks to facilitate communication between the virtual machines 108. The one or more virtual networks can overlay a physical network to form the network 106. The network devices 102 can route data packets within the virtual networks and/or physical network using MPLS. For example, the network devices 102 can route the data packets according to Internet protocol (IP) addresses, media access control (MAC) addresses, and/or hardware addresses by encapsulating the data packets with headers that include a sequence of next hop addresses. The network devices 102 can route the data packets according to one or more label stacks based on an encoded sequence of hops for each successive network device 102 in the planning route for the data packet. Each network device 102 can have a fixed hardware and/or IP address that can be included within the label stack to develop the route, represented as a sequence of label stack entries. Each label stack entry can include octets. As an example, the label stack entries can appear after data link layer headers but before network layer headers. The top of the label stack can appear earliest in the packet for the first network device in the route and the bottom of the label stack can appear latest in the packet for the destination.

The network devices 102 can act as source, destination, and/or intermediate switches in the one or more virtual networks. For example, a network device 102 can host one or more virtual machines 108 that transmit data packets or receive data packets. As another example, a network device 102 can be an intermediate node of a path between two virtual machines executing on different network devices 102.

The hypervisor 110 can manage operations of the virtual machines 108. For example, the hypervisor 110 can spawn and/or terminate one or more of the virtual machines 108, manage allocation of memory to the virtual machines 108, and/or migrate the virtual machines 108 to a different network device 102.

The network interface driver 114 can correspond to data and/or computer executable instructions related to the operation and use of the network interface card 116. While not shown, the network interface driver 114 can be included as a portion of the network interface card 116. The network interface driver 114 can include a software module running on the real operating system (OS) 112. For example, the network interface driver 114 can include one or more computer executable instructions stored in memory that, when executed by a processor, help facilitate network communications. As another example, the network interface driver 114 can be implemented as logic in a hardware processor or other integrated circuit or as a combination of hardware and software logic. The network interface driver 114 can communicate with the virtual machines 108 directly or via a guest OS of the virtual machines 108 and/or hypervisor 110.

The network interface driver 114 can be included within a network layer of a network stack of the real OS 170. For example, the network interface driver 114 can be included within a data link layer of a network stack and can communicate with a software module or application that is included in an application layer of the network stack. As another example, the network interface driver 114 can be included within a link layer of a network stack and can communicate with a transmission control protocol/Internet protocol (TCP/IP) module that is included in a transport layer of the network stack. As another example, functionality occurring within the network layer of the network stack can additionally or alternatively be configured to receive packets from another network or transport layer protocol module.

The network interface card 116 can be configured to transfer data packets over a network protocol, such as MPLS or a geo-positional, dynamic label switch routing protocol that incorporates real-time geo-positioning data with MPLS. The network interface card 116 can include a packet receiver 118, a packet forwarder 120, and a transport protocol module 122. The packet receiver 118, packet forwarder 120, and transport protocol module 122 can be implemented as one or more computer programs, specially configured electronic circuitry, or any combination thereof.

The packet receiver 118 can be configured to receive and process data packets from the virtual machines 108 of the network device 102 or other network devices. For example, the packet receiver 118 can receive a data packet from another network device 102 and decapsulate the data packet for further processing by the packet forwarder 120. The packet forwarder 120 can be configured to process and transmit data packets to the virtual machines 108 of the network device 102 or other network devices. For example, the packet forwarder 120 can encapsulate the data packet that was decapsulated by the packet receiver 118 and transmit the data packet to another network device 102. While shown as separate elements, the packet receiver 118 and packet forwarder 120 can be part of the same engine or module in the network interface card 116. Although not shown, the network interface card 116 can include one or more processors and memory. The memory may store the modules and/or engines and the processor(s) may execute the modules and/or engines.

The packet receiver 118 and packet forwarder 120 can respectively receive and transmit data packets according to the transport protocol module 122. While shown in the network interface card 116, the transport protocol module 122 can also be included in the real OS 112. The transport protocol module 122 can implement a geo-positional, dynamic label switch routing protocol that incorporates real-time geo-positioning data with MPLS based on instructions and/or data received from the network operations center 104. The transport protocol module 122 can enable the network devices 102 to be responsive to location and timing of other network devices 102 in the network 106 when routing data packets. The packet receiver 118 and packet forwarder 120 can respectively decapsulate and encapsulate data packets based on the real-time location and timing of the network devices 102 according to the transport protocol module 122. The transport protocol module 122 can further enable the network devices 102 to be responsive to health of the network devices 102 when routing data packets. The packet receiver 118 and packet forwarder 120 can respectively decapsulate and encapsulate data packets based on the health of the network devices 102 according to the transport protocol module 122. The transport protocol module 122 can develop paths for routing the data packets based on geo-position, time, network traffic, packet volume, network device health, packet priority, and/or total distance for delivery.

The geo-positioning system 124 can be configured to monitor a real-time position of the network device 102. For example, the geo-positioning system 124 can include a global positioning system (GPS) to provide location, velocity, and/or time synchronization among the network devices 102. As another example, the geo-positioning system 124 can include one or more accelerometers to monitor acceleration of the network device. Any location monitoring technology can be utilized to determine the real-time position of the network device 102, such as by determining two line element (TLE) and ephemerides data for the network device 102 for supporting handing off network links between in-plane and cross-plane network devices. The geo-positioning system 124 can be configured to transmit the real-time position, as well as velocity, acceleration, and/or time, to the network operating center 104, either directly or through the network interface card 116. The geo-positioning system 124 can transmit the real-time position continually, periodically, or in response to requests from the network operating center 104.

The health monitoring system 126 can be configured to monitor the health of the network device 102. The health monitoring system 126 can determine whether the network device 102 is functioning properly, or whether there are one or more problems with the network device 102, such as a port malfunction, link malfunction, software bug, etc., resulting in slower data packet processing or no data packet processing. The health monitoring system 126 can include one or more onboard routers to determine and communicate any health conditions to the network operating center 104 that may be causing the network device 102 to malfunction. A network operating center interface can display a plurality of nodes representing whether each network device 102 is active, e.g., functioning properly, or not. The health monitoring system 126 can use any network automation tools to monitor the health of the network device 102, including spanning tree protocols, port mirroring, traffic analysis, and/or generating synthetic traffic patterns, as examples. The health monitoring system 126 can be configured to transmit the health to the network operating center 104, either directly or through the network interface card 116. The health monitoring system 126 can transmit the real-time position continually, periodically, or in response to requests from the network operating center 104.

Figure 2:
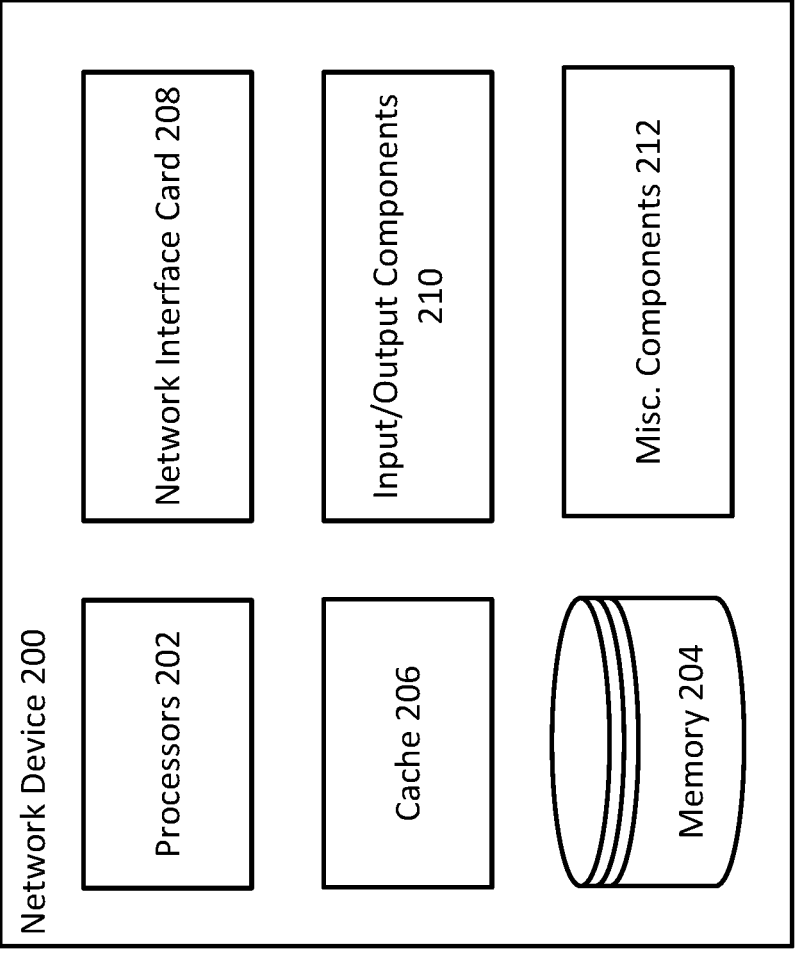
FIG. 2 depicts a block diagram of an example network computing system according to aspects of the disclosure.

FIG. 2 depicts a block diagram of an example network device 200. The network device 200 may be compared to a network device of the network devices 102 as depicted in FIG. 1. The network device 200 can include one or more processors 202, memory 204, cache 206, network interface cards 208, input/output (I/O) components 210, and/or miscellaneous components 212. Elements of the network device 200, e.g., the processors 202, memory 204, etc., can communicate via a bus.

The processors 202 can be any logic circuitry that executes instructions fetched from the memory 204 or cache 206. The processors 202 can be microprocessor units, special purpose processors, and/or circuitry on one or more chips. The processors 202 can be single core or multi-core processors. The processors 610 can be multiple distinct processors or a single processor. Example processors 202 can include central processing units (CPUs), graphic processing units (GPUs), field-programmable gate arrays (FPGAs), and/or application-specific integrated circuits (ASICs).

The memory 204 can any device configured to store data and/or computer executable instructions related to the operations and use of the network interface card 208, such as a network interface card and/or network interface driver, to be executed by the processors 202. The memory 204 can be a device with fixed storage or a device for reading removable storage media. Examples include all forms of non-volatile memory, media and memory devices, semiconductor memory devices, e.g., EPROM, EEPROM, DRAM, SDRAM, SRAM, HBM, and flash memory devices, magnetic disks, magneto-optical disks, and optical discs, e.g., CD ROM, DVD-ROM, or Blu-Ray® discs. The network device 200 can have any number of memory devices 620.

The cache 206 can be a form of memory placed in close proximity to the processors 202 for faster access times. The cache 206 can be part of, or on the same chip as, the processors 202. There can be multiple levels of cache 206, e.g., level 2 and level 3 cache layers. In some instances, instructions are read from memory 204 into the cache 206 and executed by the processors 202 from the cache 206.

The network interface card 208 can manage data exchanges, such as between network devices 200. The network interface card 208 may be compared to the network interface card 116 as depicted in FIG. 1. For example, the network interface card 208 can handle the physical and data link layers of an open systems interconnection (OSI) model for network communication. Some of the tasks of the network interface card 208 can be handled by the processors 202. The network interface card 208 can be incorporated into the processors 202, such as circuitry on the same chip.

The network interface card 208 can include one or more network interfaces configured as a connection point for a physical network link, such as a cat-5 or cat-6 Ethernet link. The network interface card 208 can further include one or more network interface ports to support wireless network connections, such as radio, receiver/transmitter. The network device 200 can exchange data with other network devices via physical or wireless links through the network interface card 208. The network interface card 208 can link directly to another device or to another device via an intermediary device, e.g., a network device such as a hub, a bridge, a switch, or a router, connecting the network device 200 to a data network such as the Internet.

The network device 200 can include, or provide interfaces for, one or more input or output (I/O) components 210. Input components can include keyboards, microphones, touch screens, sensors, and/or pointing devices, such as a mouse or trackball, as examples. Output components can include video displays, speakers, and/or printers, as examples. The network device 200 can further include miscellaneous components 212, such as an I/O interface, external serial device ports, and/or any additional co-processors. For example, the network device 200 may include an interface, e.g., a universal serial bus (USB) interface, for connecting input devices, output devices, and/or additional memory devices, e.g., portable flash drive or external media drive. The network device 200 can include an additional co-processor, such as a math co-processor to assist the processors 202 with high precision or complex calculations.

Figure 3:
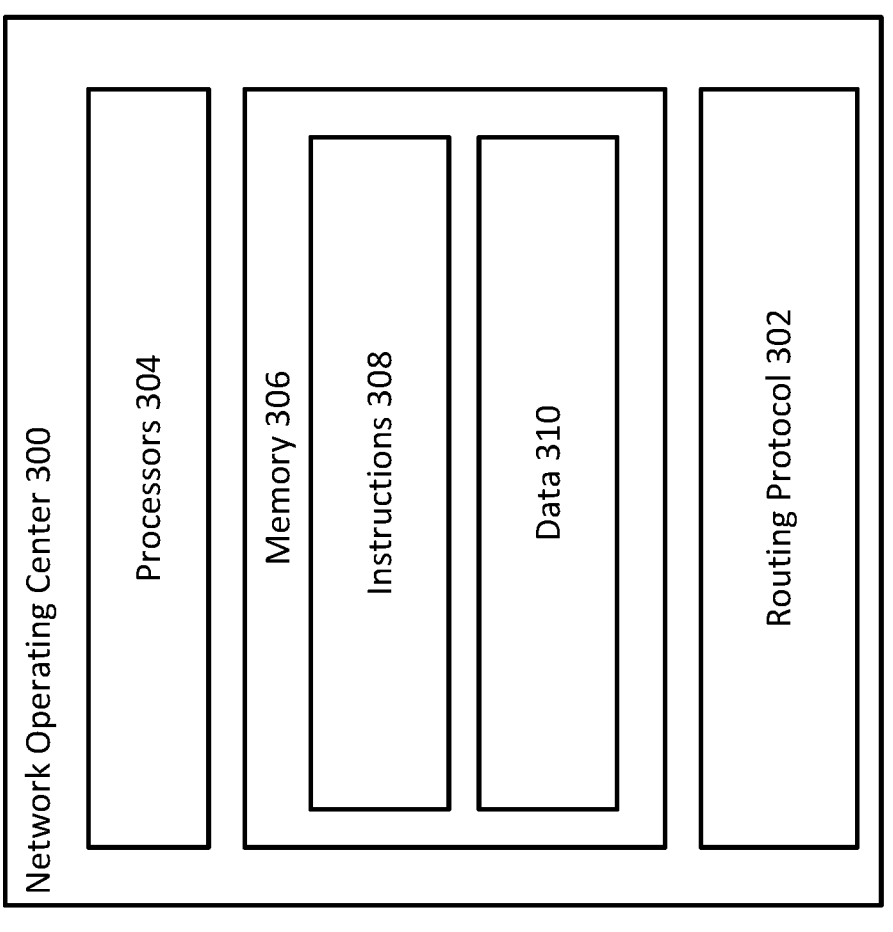
FIG. 3 depicts a block diagram of an example network operating center implementing a routing protocol that incorporates a geo-positional, dynamic label switch routing protocol according to aspects of the disclosure.

FIG. 3 depicts a block diagram of an example network operating center 300 for assisting with the implementation of a geo-positional, dynamic label switch routing protocol 302 that incorporates real-time geo-positioning data with MPLS. The network operating center 300 may be compared to the network operating center 104 as depicted in FIG. 1. The network operating center 300 can be implemented on one or more computing devices in one or more locations.

The network operating center 300 can include one or more processors 304 and memory 306. The processors 304 can include one or more central processing units (CPUs), graphic processing units (GPUs), field-programmable gate arrays (FPGAs), and/or application-specific integrated circuits (ASICs), as examples. The memory 306 can store information accessible by the processors 304, including instructions 308 that can be executed by the processors 304 and data 310 that can be retrieved, manipulated, or stored by the processors 304. The memory 316 can be a type of transitory or non-transitory computer readable medium capable of storing information accessible by the processors 304, such as volatile and non-volatile memory. Example memory 306 include all forms of non-volatile memory, media and memory devices, semiconductor memory devices, e.g., EPROM, EEPROM, DRAM, SDRAM, SRAM, HBM, and flash memory devices, magnetic disks, magneto-optical disks, and optical discs, e.g., CD ROM, DVD-ROM, or Blu-Ray® discs.

The instructions 308 can include one or more instructions that when executed by the processors 304, cause the one or more processors to perform actions defined by the instructions 308. The instructions 308 can be stored in object code format for direct processing by the processors 304, or in other formats including interpretable scripts or collections of independent source code modules that are interpreted on demand or compiled in advance. The instructions 308 can include instructions for implementing the routing protocol 302 to route data packets according to real-time geo-position data. The routing protocol 302 can be executed using the processors 304, and/or using other processors remotely located from the network operating center 300.

The data 310 can be retrieved, stored, or modified by the processors 304 in accordance with the instructions 308. The data 310 can be stored in computer registers, in a relational or non-relational database as a table having a plurality of different fields and records, or as JSON, YAML, proto, or XML documents. The data 310 can also be formatted in a computer-readable format such as, but not limited to, binary values, ASCII, or Unicode. Moreover, the data 310 can include information sufficient to identify relevant information, such as numbers, descriptive text, proprietary codes, pointers, references to data stored in other memories, including other network locations, or information that is used by a function to calculate relevant data.

The processors 304 and the memory 306 can include multiple processors and memories that can operate in different physical locations and not within the same computing device. For example, some of the instructions 308 and the data 310 can be stored on a removable SD card and other instructions within a read-only computer chip. Some or all of the instructions 308 and data 310 can be stored in a location physically remote from, yet still accessible by, the processors 304. Similarly, the processors 304 can include a collection of processors that can perform concurrent and/or sequential operations. The network operating center 300 can include one or more internal clocks providing timing information, which can be used for time measurement for operations and programs run by the network operating center 300.

The network operating center 300 can be capable of direct and indirect communication over a network. The network operating center 300 can set up listening sockets that may accept an initiating connection for sending and receiving information. The network itself can include various configurations and protocols including the Internet, World Wide Web, intranets, virtual private networks, wide area networks, local networks, and private networks using communication protocols proprietary to one or more companies. The network can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication.

Although a single device is shown in FIG. 3 for the network operating center 300, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device or any combination thereof.

FIG. 4 depicts a flow diagram of an example process 400 for routing data packets in a network based on a geo-positional, dynamic label switch routing protocol. The example process 400 can be performed on a system of one or more processors in one or more locations, such as the example network devices 102 as depicted in FIG. 1. The network can be a SD-WAN and the network devices can correspond to LEO satellite optical links for communicating data, such as audio or video communications. Since LEO satellites do not follow a strict path, the geo-positional, dynamic label switching routing protocol allows for improving pathway selection for data packet routing among LEO satellites. A network operating center can derive an Intercessor network label switch path from a data transfer request. The intercessor network label switch path can refer to a hop by hop roadmap across the network devices based on label forwarding information, which guides label switch routers in the network devices to swap an incoming label with an outgoing label. The label forwarding information can be based on a real-time geo-position and/or health of the network devices.

As shown in block 410, a network device 102 can receive a data packet for transmission to one or more destinations. The network device 102 can be a host or server device executing one or more virtual machines on one or more processors. The one or more destinations can include one or more virtual machines on one or more other network devices 102. The network device 102 can also receive the data packet from another network device of the one or more other network devices 102.

As shown in block 420, the network device 102 can receive data associated with a real-time geo-position of one or more network devices 102 of the network. The network device 102 can receive the data from a network operating center for managing the network devices 102 of the network. The data associated with the real-time geo-position of the one or more network devices 102 can include location, velocity, acceleration, and/or time of each of the one or more network devices 102. The network device 102 can receive the data continually or periodically.

As shown in block 430, the network device 102 can receive data associated with a health of the one or more network devices 102 of the network. The network device 102 can receive the data from the network operating center. The data associated with the health of the one or more network devices can include whether each network device is functioning properly or whether there are problems with a network device, such as port malfunction, link malfunctions, and/or software bugs. The network device 102 can receive the data continually or periodically.

As shown in block 440, the network device 102 can determine a next hop destination for the data packet based on the data associated with the real-time geo-position and/or health of the one or more network devices 102 of the network. For example, the network device 102 can determine a closest other network device compared to the network device 102 at a given point in time to be the next hop destination, improving pathway selection for the network device 102. The network device 102 can further determine whether that closest other network device is functioning at a sufficient threshold level with respect to health of the network device to be the next hop destination. As other examples, the network device 102 can determine the next hop destination for the data packet based on volume of data in the data packet, a destination delivery timeline, weather over primary and alternate downstream devices, volume or traffic load already moving through the network, and/or ground networks that allow for a closest point of approach for dissemination of the data packet to its destination.

As shown in block 450, the network device 102 can encapsulate the data packet with a header based on the next hop destination. The header can be a shim header and can include one or more addresses and/or one or more label stacks for one or more network devices 102 corresponding to the next hop destination. The addresses can include an IP address and/or a MAC address of label switch and/or label edge routers in the MPLS scheme. The label stacks can be based on an encoded sequence of hops for each successive network device in the planning route for the data packet.

As shown in block 460, the network device 102 can transmit the encapsulated packet to one or more network devices 102 corresponding to the next hop destination.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, which is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of routing data packets in a network comprising:

receiving, by one or more processors of a network device, a data packet for transmission to one or more destinations, wherein the data packet includes a header comprising data associated with a real-time geo-position of one or more other network devices;

determining, by the one or more processors, a destination network device of the one or more other network devices based on the data associated with the real-time geo-position of the one or more other network devices;

modifying the header to include an address for the destination network device and a current geo position of the network device;

encapsulating, by the one or more processors, the data packet with the modified header; and transmitting, by the one or more processors, the encapsulated packet.

2. The method of claim 1, further comprising receiving, by the one or more processors, data associated with a health of the one or more other network devices.

3. The method of claim 2, wherein determining the destination network device is further based on the data associated with the health of the one or more other network devices.

4. The method of claim 1, wherein the one or more destinations further comprise one or more virtual machines.

5. The method of claim 1, wherein the data associated with the real-time geo-position of the one or more other network devices further comprises a location and time of each of the one or more other network devices.

6. The method of claim 1, wherein the header comprises a shim header and the address comprises at least one of an Internet protocol (IP) address or a media access control (MAC) address.

7. The method of claim 1, wherein the network is employed in low earth orbit (LEO).

8. The method of claim 1, wherein the network comprises a software defined wide area network (SD-WAN).

9. A system comprising:

one or more processors; and one or more storage devices coupled to the one or more processors and storing instructions that, when executed by the one or more processors, cause the one or more processors to perform operations for routing data packets in a network, the operations comprising:

receiving a data packet for transmission to one or more destinations, wherein the data packet includes a header comprising data associated with a real-time geo-position of one or more other network devices;

determining a destination network device of the one or more other network devices based on the data associated with the real-time geo-position of the one or more other network devices;

modifying the header to include an address for the destination network device and a current geo position of the network device;

encapsulating the data packet with the modified header; and transmitting the encapsulated packet.

10. The system of claim 9, wherein the operations further comprise receiving data associated with a health of the one or more other network devices.

11. The system of claim 10, wherein determining the destination network device is further based on the data associated with the health of the one or more other network devices.

12. The system of claim 9, wherein the one or more destinations further comprise one or more virtual machines.

13. The system of claim 9, wherein the data associated with the real-time geo-position of the one or more other network devices further comprises a location and time of each of the one or more other network devices.

14. The system of claim 9, wherein the header comprises a shim header and the address comprises at least one of an Internet protocol (IP) address or a media access control (MAC) address.

15. The system of claim 9, wherein the network comprises a software defined wide area network (SD-WAN) employed in low earth orbit (LEO).

16. A non-transitory computer readable medium for storing instructions that, when executed by one or more processors, cause the one or more processors to perform operations for routing data packets in a network, the operations comprising:

receiving a data packet for transmission to one or more destinations, wherein the data packet includes a header comprising data associated with a real-time geo-position of one or more other network devices;

determining a destination network device of the one or more other network devices based on the data associated with the real-time geo-position of the one or more other network devices;

modifying the header to include an address for the destination network device and a current geo position of the network device;

encapsulating the data packet with the modified header; and transmitting the encapsulated packet.

17. The non-transitory computer readable medium of claim 16, wherein:

the operations further comprise receiving data associated with a health of the one or more other network devices; and determining the destination network device is further based on the data associated with the health of the one or more other network devices.

18. The non-transitory computer readable medium of claim 16, wherein the data associated with the real-time geo-position of the one or more other network devices further comprises a location and time of each of the one or more other network devices.

19. The non-transitory computer readable medium of claim 16, wherein the header comprises a shim header and the address comprises at least one of an Internet protocol (IP) address or a media access control (MAC) address.

20. The non-transitory computer readable medium of claim 16, wherein the network comprises a software defined wide area network (SD-WAN) employed in low earth orbit (LEO).

\* \* \* \* \*